United States Patent
Massanell et al.

(10) Patent No.: US 9,726,754 B2
(45) Date of Patent: Aug. 8, 2017

(54) METHOD AND DEVICE FOR CALIBRATING A 3D TOF CAMERA SYSTEM

(75) Inventors: Javier Massanell, Markdorf (DE); Volker Frey, Wangen (DE); Thomas May, Constance (DE)

(73) Assignee: ifm electronic GmbH, Essen (DE)

( * ) Notice: Subject to any disclaimer, the term of this patent is extended or adjusted under 35 U.S.C. 154(b) by 1046 days.

(21) Appl. No.: 13/450,940

(22) Filed: Apr. 19, 2012

(65) Prior Publication Data

US 2012/0206575 A1  Aug. 16, 2012

Related U.S. Application Data

(63) Continuation of application No. PCT/EP2010/066167, filed on Oct. 26, 2010.

(30) Foreign Application Priority Data

Oct. 28, 2009  (DE) .................. 10 2009 046 124

(51) Int. Cl.
*H04N 17/00* (2006.01)
*G01S 7/497* (2006.01)
*G01S 17/36* (2006.01)
*G01S 17/93* (2006.01)

(52) U.S. Cl.
CPC ............. *G01S 7/4972* (2013.01); *G01S 17/36* (2013.01); *G01S 17/936* (2013.01)

(58) Field of Classification Search
CPC ............................ G06T 7/0018; G01S 7/4972
USPC ................................................... 348/113–117
See application file for complete search history.

(56) References Cited

U.S. PATENT DOCUMENTS

| | | | |
|---|---|---|---|
| 7,236,121 B2 * | 6/2007 | Caber | 342/62 |
| 2009/0173820 A1 * | 7/2009 | Bock | 244/3.15 |

FOREIGN PATENT DOCUMENTS

| | | |
|---|---|---|
| DE | 10246066 A1 | 4/2004 |
| EP | 0899543 A2 | 3/1999 |
| EP | 1010577 A2 | 6/2000 |
| WO | 0075687 A1 | 12/2000 |

* cited by examiner

*Primary Examiner* — Christopher S Kelley
*Assistant Examiner* — Jonathan Messmore
(74) *Attorney, Agent, or Firm* — MacMillan, Sobanski & Todd, LLC

(57) ABSTRACT

A method for calibrating a three dimensional time-of-flight camera system mounted on a device, includes determining at a first instant a direction vector relating to an object; determining an expected direction vector and expected angle for the object to be measured at a second instant with reference to the device's assumed trajectory and optical axis of the camera; determining a current direction vector and current angle at the second instant; determining an error represented by a difference between the current direction vector and the expected direction vector; and using the error to correct the assumed direction of the main optical axis of the camera system such that said error is substantially eliminated.

10 Claims, 2 Drawing Sheets

METHOD AND DEVICE FOR CALIBRATING A 3D TOF CAMERA SYSTEM

BACKGROUND OF THE INVENTION

1. Field of the Invention

This invention relates generally to a method for calibrating a 3D TOF camera system, and to a moveable device to which the camera is secured and on which it is carried.

2. Description of the Prior Art

Systems for three-dimensional image acquisition operate with the aid of active illumination. They include so-called time-of-flight (TOF) measurement systems. They also comprise lidar and radar systems, in particular. These time-of-flight measurement systems use a chiefly amplitude-modulated or pulsed illumination to light up the three-dimensional scenery to be detected.

A camera system is, in particular, to be taken to comprise all 3D TOF camera systems that obtain a time-of-flight information item from the phase shift of an emitted and received radiation. The camera system is typically divided into a transmitter, for example an active illumination, and a receiver, for example a camera. Particularly suitable as 3D TOF cameras are PMD cameras having photomix detectors (PMDs) which are as described, inter alia, in the applications EP 1 777 747, U.S. Pat. No. 6,587,186 and also DE 197 04 496 and may be acquired as O3D frame grabbers from 'ifm electronic gmbh'. The PMD camera or camera system particularly permits a flexible arrangement of the light source (active illumination) and of the receiver, which can be arranged either in one housing or else separately.

SUMMARY OF THE INVENTION

A method for calibrating a three dimensional time-of-flight camera system mounted on a device, includes determining at a first instant a direction vector relating to an object; determining an expected direction vector and expected angle for the object to be measured at a second instant with reference to the device's assumed trajectory and optical axis of the camera; determining a current direction vector and current angle at the second instant; determining an error represented by a difference between the current direction vector and the expected direction vector; and using the error to correct the assumed direction of the main optical axis of the camera system such that said error is substantially eliminated.

The method improves the security and reliability of a 3D TOF camera system.

The method permits checking the calibration and adjustment of the camera system, even during normal operation, with the aid of suitable objects to be measured.

The method permits improvement of the accuracy of the calibration monitoring by detecting a plurality of objects to be measured whose distance is known.

In a further refinement, a decalibration of the system can advantageously be determined with the aid of the determined vector difference.

An error signal can be provided as a function of the magnitude of the vector difference and, furthermore, an autocalibration of the system can be performed as a function of the magnitude of the vector difference or decalibration.

DESCRIPTION OF THE DRAWINGS

The invention is explained below in more detail with the aid of exemplary embodiments and with reference to the drawings, in which.

DESCRIPTION OF THE PREFERRED EMBODIMENT

Figure 1:
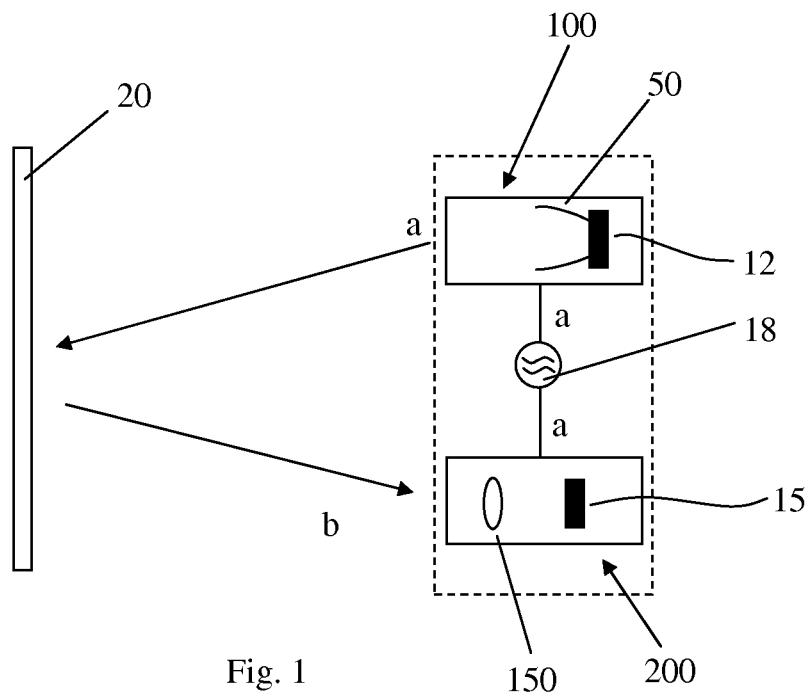
FIG. 1 is a schematic of a TOF camera system.

FIG. 1 shows a measurement situation for an optical range measurement with the aid of a TOF camera system such as is known, for example, from DE 197 04 496. The camera system 200 is secured to a moveable device 300, such as a car, vehicle, machine or machine component.

The TOF camera system 200 here comprises a transmitting unit or an active illumination 100 with a light source 12 and an associated beam-shaping optics 50, as well as a receiving unit or 3D TOF camera 200 with a receiving optics 150 and a photosensor 15. The photosensor 15 is preferably designed as a pixel array, in particular as a PMD sensor. The receiving optics typically consists of a plurality of optical elements in order to improve the imaging properties. The beam shaping optics 50 of the transmitting unit 100 is preferably designed as a reflector. However, it is also possible to use diffractive elements, or combinations of reflecting and diffractive elements.

The measurement principle of this arrangement is based substantially on the fact that the time of flight of the emitted and reflected light can be determined starting from the phase difference of the emitted and received light. To this end, a first phase angle a is applied to the light source 12 and the photosensor 15 via a modulator 18 in common with a specific modulation frequency. In accordance with the modulation frequency, the light source 12 emits an amplitude-modulated signal with the phase angle a. In the case illustrated, this signal or the electromagnetic radiation is reflected by an object 20 and strikes the photosensor 15 at a second phase angle b in a correspondingly phase-shifted fashion because of the path covered. In the photosensor 15, the signal of the first phase angle a of the modulator 18 is mixed with the received signal, which in the meantime has assumed a second phase angle b, and the phase shift or the range of the object is determined from the resulting signal.

Camera systems such as, for example, lidar, radar or 3D TOF camera systems, which are used in motor cars, commercial vehicles, movable machines, machine parts, etc., should also as a rule be checked for deadjustment and/or decalibration between service operations, with the aid of suitable measures.

The calibration method can be used not only to undertake calibration during service operations, but also to enable automatic correction of the calibration or deadjustment even between the service operations.

The method can be used for camera axis calibration with the aid of a single stationary object to be measured or the aid of two objects to be measured.

For calibration with the aid of a single object to be measured, it is provided that suitable stationary objects are detected and identified. In the case of a 3D system used in traffic, suitable objects are, for example, road signs, traffic delineators or similar stationary identified objects. Concerning use in machines, it is possible here to make use of particular machine parts or customized reflectors.

After a suitable object has been identified in the surroundings as an object to be measured, further measurements are undertaken with the aid of this object to be measured. The first step is to determine the vector from the 3D camera to the object to be measured in terms of angular position and range. Starting from a known trajectory of the vehicle, there is calculated for a second instant a direction vector under which the object to be measured is expected at this second instant. If the angle of the direction vector deviates from the expected angle, an erroneous angular position can be determined starting from the known trajectory, and corrected.

If, in addition, it is not only the direction of the trajectory that is known, but also the path covered, it is also possible to determine and correct the distance offset error as well as the erroneous angle. The trajectory of the vehicle can, for example, be given by its yaw angle, that is to say the current radius of curvature of the driving direction of the vehicle and the path covered. With the aid of such a completely known trajectory, it suffices for calibration purposes to detect the position of a stationary point, and to determine the trajectory when driving past. A deadjustment or decalibration of the system can be identified and rectified from the difference between the measured trajectory and the current trajectory.

When two objects whose relative distance from one another is known are being detected, it is already possible, given a stationary vehicle, to determine a deadjustment of the system by determining the angle between the main optical axis and the connecting line between the objects and the distance from the objects. Since the triangle is already completely determined from the distances between the objects and the camera system, it is thereby possible to check the angles for their correctness. When these two objects are being driven past, it is possible to use the known trajectory to determine both the erroneous angular position and a distance offset error. In principle, the erroneous angular position can be determined via the trajectory, and the error in the TOF measurement can be determined via the optical imaging ratio.

Figure 2:
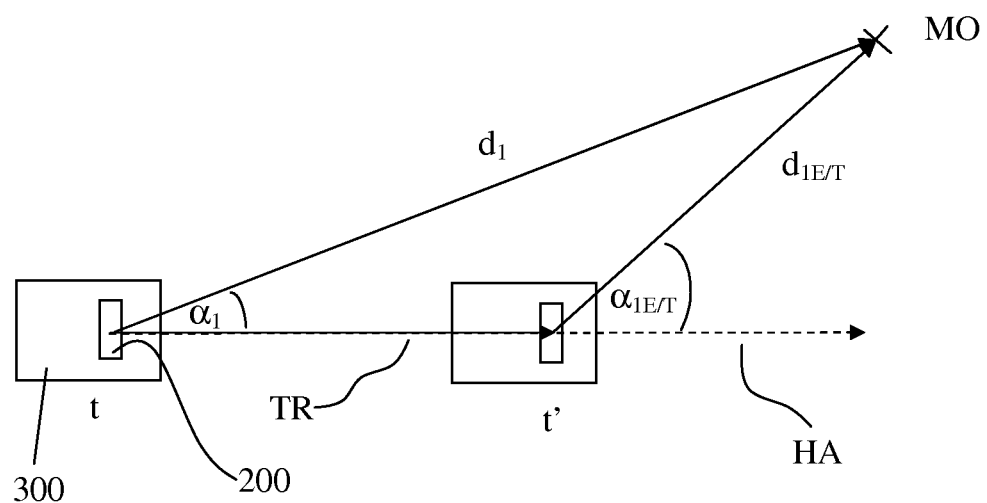
FIG. 2 shows a measurement situation with a stationary object to be measured.

FIG. 2 shows a measurement situation with a single stationary object to be measured MO in a calibrated and well adjusted state. At a first instant t, the object to be measured MO is identified and detected by the 3D TOF camera 200 secured to a vehicle or other moveable device 300 at a first angle $\alpha_1$ and at a first distance $d_1$. The object angle $\alpha$ is detected in the process, with reference to the main optical axis HA of the 3D TOF camera 200. It is assumed in the case illustrated that the trajectory TR of the moveable device 300 typically proceeds in the direction of the main optical axis HA. At a second instant t', the object to be measured MO is expected to be under an expected direction vector $d_{1E}$ at an expected angle $\alpha_{1E}$ to the main axis HA because of the direction of the path or the path covered. In the example illustrated in FIG. 2, the expected direction vector $d_{1E}$ and the expected direction angle $a_{1E}$ coincide with the current direction vector $d_{1T}$ and angle $\alpha_{1T}$. The current and expected measured magnitudes therefore coincide and document a perfectly adjusted and calibrated camera system.

Figure 3:
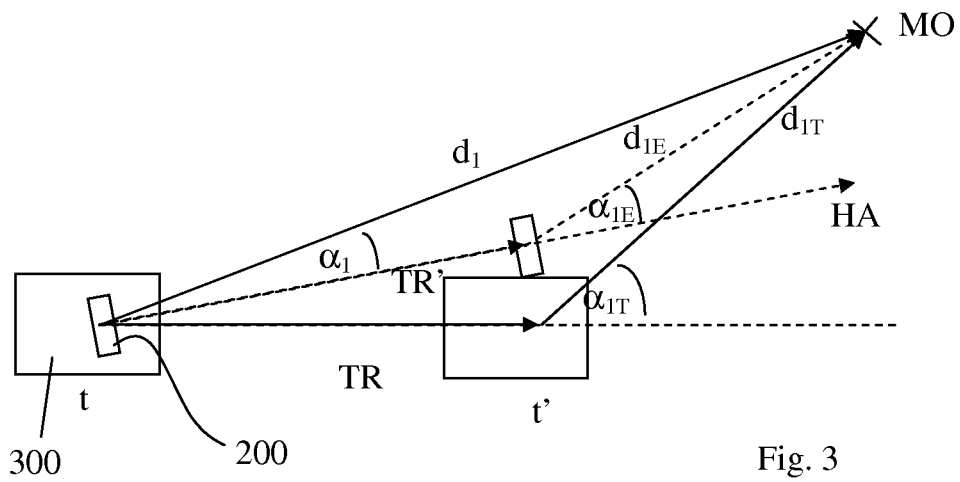
FIG. 3 shows a measurement situation in a deadjusted state of the camera.

By contrast, a deadjusted system is shown in FIG. 3. As usual, at a first instant t the angle $\alpha 1$ and the distance $d_1$ of the object to be measured MO are determined in relation to the main optical axis HA of a 3D TOF camera 200 secured to the moveable device 300. For a calibrated system, the first step is to assume that the expected trajectory TR' is aligned in the direction of the main optical axis HA. Starting from the expected trajectory TR', an expected first direction vector $d_{1E}$ and an expected angle $\alpha_{1E}$ are calculated. In fact, however, the moveable device 300 moves not on the expected trajectory TR', but on the current trajectory TR, and so at the second instant t' a current angle $\alpha_{1T}$ and a current direction vector $d_{1T}$ are determined in relation to the object to be measured MO. Starting from the discrepancy between the expected and current magnitudes, it is assumed that a deadjustment or a decalibration of the system is required. Starting from the direction vector differences and/or angular differences, the extent of the deadjustment or decalibration can be determined. In a first refinement, it may for example already suffice here to specify an error signal as a function of the magnitude of the deviations. In particular, it can be provided to set a threshold value from which a significant error is to be reported. In addition, it is conceivable not only to make an error report dependent on a single measurement, but also to output it after a predetermined number of control measurements.

Figure 4:
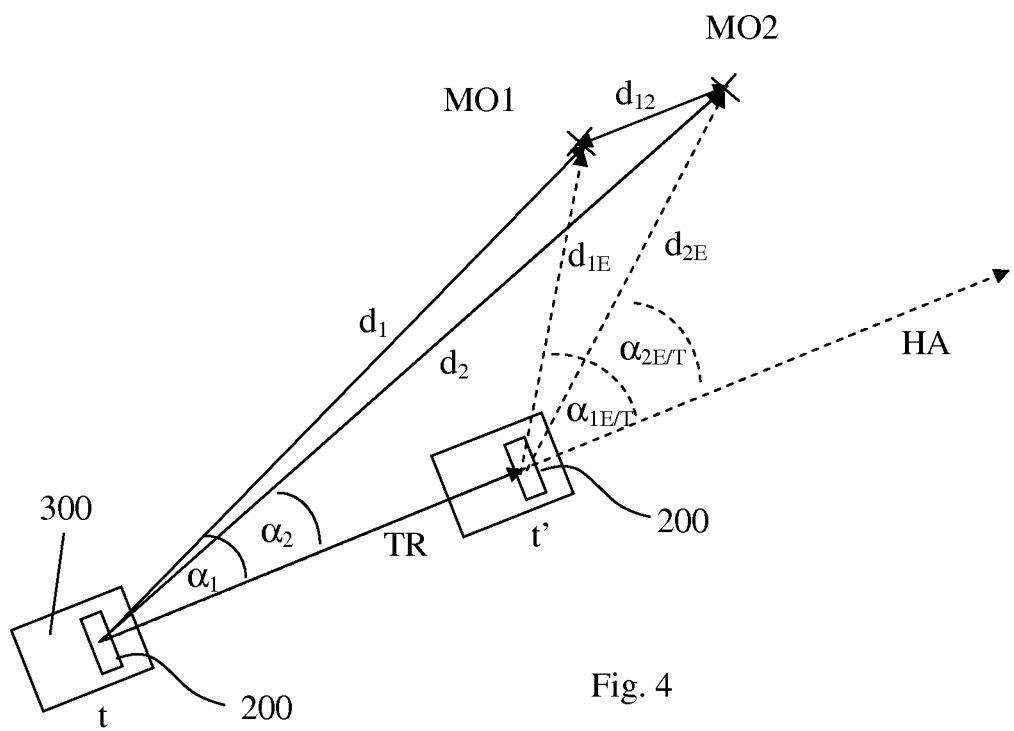
FIG. 4 shows a measurement situation with two stationary objects to be measured with known distances.

FIG. 4 shows a further inventive refinement, in which two objects to be measured MO1, MO2 with a known distance from camera 200 and moveable device 300 are detected. Particularly suitable here in road traffic are guiding posts that are typically set up in an equidistant fashion. In the case illustrated in FIG. 4, at a first instant t the direction vectors $d_1$, $d_2$ are determined in relation to the first and second objects to be measured MO1, MO2 in terms of distance and angle relative to a main optical axis HA of the camera system 200. Even at this first instant t, it is possible to determine first calibration and/or adjustment errors on the basis of the overdetermined measurement triangle. The accuracy of the error estimate can be increased further by repeating the measurements at a second instant t' and comparing them with the expected magnitudes. In the example illustrated, the expected magnitudes coincide with the current magnitudes, and so no error or outlay on adjustment is determined.

If a deadjustment of the system is present, it may be assumed to a first approximation that the expected trajectory TR' deviates from the current trajectory TR in a fashion similar to that already illustrated in FIG. 3. The expected and current direction vectors and angles then deviate from one another correspondingly in a way similar to the case illustrated in FIG. 3. In order to improve the measuring accuracy and/or to provide plausibility, it is also conceivable to detect a plurality of, that is to say more than two, objects to be measured at a first and second or, if appropriate, further instants, and to evaluate them and calculate the direction vectors to be expected.

LIST OF REFERENCES SYMBOLS

MO object to be measured
MO1 first object to be measured
MO2 second object to be measured
TR current trajectory
TR' expected trajectory
HA main axis
$d_1$ first direction vector or first distance from the first object to be measured
$d_2$ second direction vector or second distance from the second object to be measured
$d_{12}$ known distance between first and second objects to be measured
$d_{1/2E}$ first/second expected direction vector or first/second distance
$d_{1/2E}$ first/second current direction vector or first/second distance
$\alpha_1$ angle of the first direction vector with reference to main axis
$\alpha_2$ angle of the second direction vector with reference to the main axis $\alpha_{1/2E}$ expected first/second direction angle
$\alpha_{1/2T}$ current first/second direction angle
t first instant
t' second instant

The invention claimed is:

1. A method for calibrating a three dimensional time-of-flight camera system mounted on a moveable device, comprising the steps of:
  detecting and identifying at least one object to be measured (MO, MO1/2);
  determining at a first instant a direction vector ($d_1$) relating to at the least one object to be measured (MO, MO1/2);
  determining an expected direction vector ($d_{1E}$) and an expected angle ($\alpha_{1E}$) for the object to be measured that are expected at a second instant (t') later than the first instant with reference to an assumed trajectory (TR') of the device and an assumed direction of the main optical axis (HA) of the camera system;
  detecting the object to be measured (MO, MO1, MO2) at the second instant (t') and determining a current direction vector ($d_{1T}$) and current angle ($\alpha_{1T}$) with reference to the assumed trajectory (TR') of the device and assumed direction of the main optical axis (HA) of the camera system;
  determining an error represented by a difference between the current direction vector ($d_{1T}$) and the expected direction vector ($d_{1E}$); and
  using the error to correct the assumed direction of the main optical axis of the camera system such that said error is substantially eliminated.

2. The method of claim 1 wherein an error signal is produced as a function of the magnitude of the vector difference.

3. The method of claim 1 wherein said error is used to automatically correct the assumed direction of the main optical axis of the camera system such that said difference is substantially eliminated.

4. A method for calibrating a three dimensional time-of-flight camera system mounted on a moveable device, comprising the steps of:
  detecting and identifying at least two objects to be measured (MO1, MO2), each object being spaced from the other object by a known distance;
  determining at a first instant (t) a first set of direction vectors (d1, d2) relating to the two objects to be measured (MO1, MO2);
  determining expected direction vectors ($d_{1E}$, $d_{2E}$) for the two objects to be measured (MO1, MO2) that are expected at a second instant (t') later than the first instant with reference to an assumed trajectory (TR') of the device and an assumed direction of the main optical axis (HA) of the camera system;
  detecting the objects to be measured (MO1, MO2) at the second instant (t'), and determining a second set of current direction vectors ($d_{1T}$, $d_{2T}$) with reference to the assumed trajectory (TR') of the device and the assumed direction of the main optical axis (HA) of the camera system;
  determining an error represented by respective differences between the current direction vectors ($d_{1E}$, $d_{2E}$) and the expected direction vectors ($d_{1T}$, $d_{2T}$); and
  using the error to correct the assumed direction of the main optical axis of the camera system such that said error is substantially eliminated.

5. The method of claim 4 wherein an error signal is produced as a function of the magnitude of the vector difference.

6. The method of claim 4 wherein said error is used to automatically correct the assumed direction of the main optical axis of the camera system such that said difference is substantially eliminated.

7. A method for calibrating a three dimensional time-of-flight camera system mounted on a moveable device, comprising the steps of:
  detecting and identifying two objects to be measured (MO1, MO2), each object being spaced from the other object by a known distance ($d_{12}$);
  determining a set of direction vectors (d1, d2) and angles ($\alpha_1$, $\alpha_2$) relating to the two objects to be measured (MO1, MO2) with reference to an assumed direction of the main optical axis (HA) of the camera system;
  using the set of direction vectors (d1, d2) and angles ($\alpha_1$, $\alpha_2$) to determine an indicated distance between the two objects to be measured (MO1, MO2);
  determining an error represented by a difference between the known distance ($d_{12}$) and the indicated distance; and
  using the error to correct the assumed direction of the main optical axis of the camera system such that said error is substantially eliminated.

8. The method of claim 7 wherein an error signal is produced as a function of the magnitude of the difference between the known distance ($d_{12}$) and the indicated distance.

9. The method of claim 7 wherein said error is used to automatically correct the assumed direction of the main optical axis of the camera system such that said difference between the known distance ($d_{12}$) and the indicated distance is substantially eliminated.

10. A three dimensional time-of-flight camera system able to be mounted on a moveable device and adapted to execute the steps of:
  detecting and identifying at least one object to be measured (MO, MO1/2);
  determining at a first instant a direction vector ($d_1$) relating to at the least one object to be measured (MO, MO1/2);
  determining an expected direction vector ($d_{1E}$) and an expected angle ($\alpha_{1E}$) for the object to be measured that are expected at a second instant (t') later than the first instant with reference to an assumed trajectory (TR') of the device and an assumed direction of the main optical axis (HA) of the camera system;
  detecting the object to be measured (MO, MO1, MO2) at the second instant (t') and determining a current direction vector ($d_{1T}$) and current angle ($\alpha_{1T}$) with reference to the assumed trajectory (TR') of the device and assumed direction of the main optical axis (HA) of the camera system;
  determining an error represented by a difference between the current direction vector ($d_{1T}$) and the expected direction vector ($d_{1E}$); and
  using the error to correct the assumed direction of the main optical axis of the camera system such that said error is substantially eliminated.

* * * * *